United States Patent [19]

Phillips

[11] Patent Number: 4,555,003
[45] Date of Patent: Nov. 26, 1985

[54] SPLIT ENGINE CLUTCH

[76] Inventor: Howard L. Phillips, P.O. Box 392, Safford, Ariz. 85546

[21] Appl. No.: 533,421

[22] Filed: Sep. 19, 1983

[51] Int. Cl.$^4$ .................. F02B 75/32; F16D 11/04; F16D 23/04
[52] U.S. Cl. ................ 192/53 B; 123/198 F; 192/53 R; 192/67 A; 192/48.5
[58] Field of Search ............... 192/0.098, 0.07, 53 R, 192/53 B, 53 F, 67 A, 67 R, 99 S, 48.5; 60/718; 123/197 C, 198 F

[56] References Cited

U.S. PATENT DOCUMENTS

| | | | |
|---|---|---|---|
| 902,692 | 11/1908 | Sherman | 192/0.096 |
| 1,121,114 | 12/1914 | Moore | 60/718 |
| 3,385,407 | 5/1968 | Kleinhans et al. | 192/53 B |
| 3,460,656 | 8/1969 | Swanson | 192/0.098 |
| 4,069,803 | 1/1978 | Cataldo | 192/53 B |
| 4,389,985 | 6/1983 | Huber et al. | 123/198 F |
| 4,421,217 | 12/1983 | Vagias | 192/85 C |

Primary Examiner—Rodney H. Bonck
Assistant Examiner—Alan G. Towner
Attorney, Agent, or Firm—Don J. Flickinger

[57] ABSTRACT

This relates to a synchronizing clutch for use in a split crankshaft engine of a type which includes a main crankshaft section and at least one auxiliary crankshaft section. An input section is fixedly coupled to a first end of the main crankshaft section and drives a clutch plate. First and second engagement plates are rotatably coupled on the input section and each include at least first and second apertures. The first aperture in the first engagement plate resides in a different orbit than that of the second aperture. A pin plate is fixedly coupled to an adjacent end of the auxiliary crankshaft section and is provided with first and second pins which correspond in orbit to that of the first and second apertures in the first engagement plate. Actuation means are provided for disengaging the clutch plate and substantially reducing the speed of the second engagement plate to permit insertion of the first and second pins into slots in the second engagement plate. After the clutch plate is again engaged, the first engagement plate is caused to rotate with respect to the second engagement plate thus permitting the first and second pins to fall into the first and second apertures respectively in the first engagement plate. In this manner, the auxiliary crankshaft section is coupled, in phase to the main crankshaft section.

11 Claims, 10 Drawing Figures

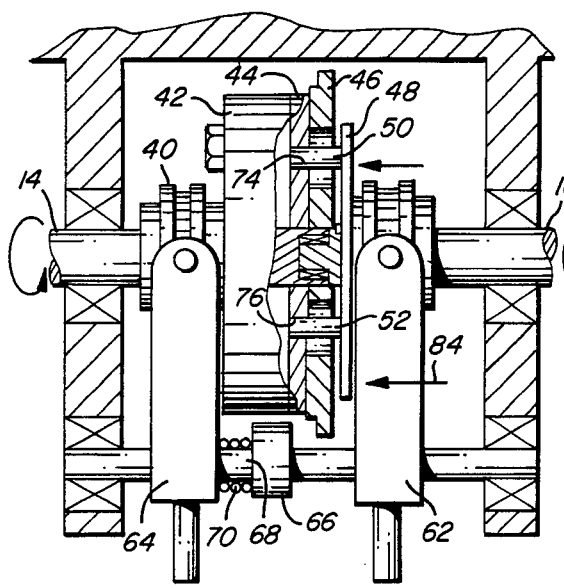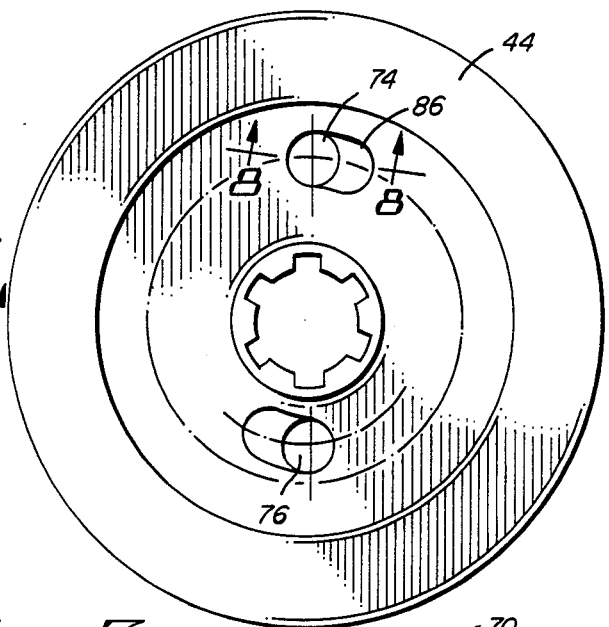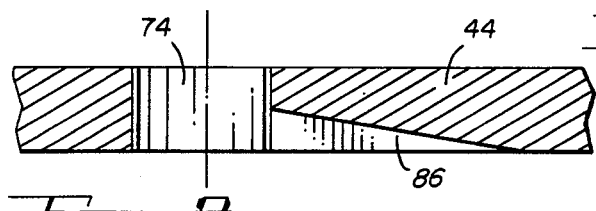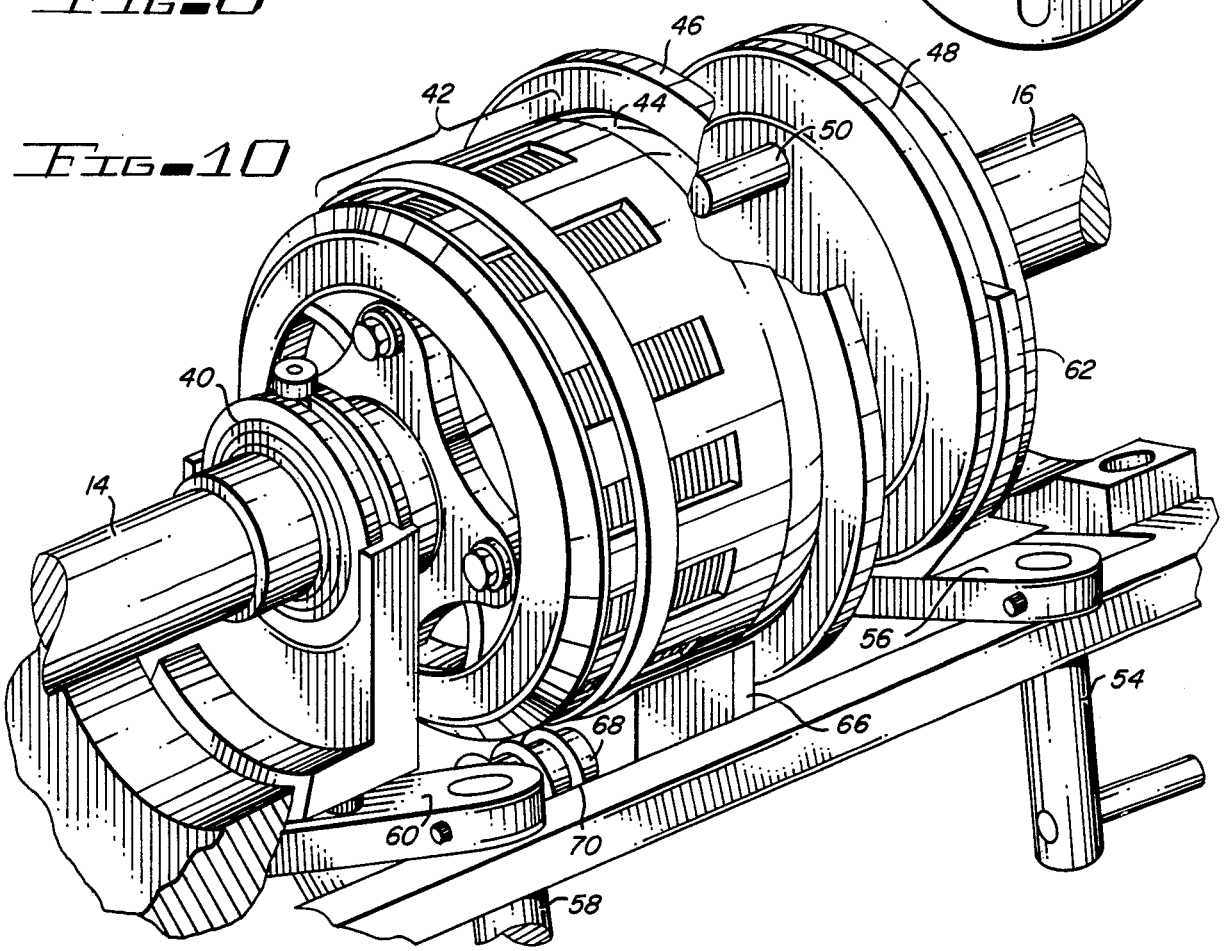

SPLIT ENGINE CLUTCH

BACKGROUND OF THE INVENTION

1. Field of the Invention

This invention relates generally to a positive engaging clutch, and more particularly, to a synchronizing clutch suitable for split engine crankshaft operation so as to permit an engine to operate on less than all of its cylinders under light load conditions and on all of its cylinders under full engine load conditions.

2. Prior Art

In the past decade, the cost of gasoline has increased significantly as a result of the dwindling supply of fossil fuel and the dependence upon the supply of oil from foreign countries. Accompanying this trend is the increased awareness of environmental pollution, which has resulted in stringent pollution controls on today's automobile engines. Such controls increase energy costs for operation of the vehicle and have motivated the automobile industry toward smaller engines. Microprocessor technology has also advanced to a point where the automobile industry is adopting microprocessor based engine control systems which offer a more accurate control of fuel mixtures and spark time so as to increase efficiency.

In an effort to reduce fuel consumption, one manufacturer has combined a microprocessor engine control system with a variable cylinder drive scheme such that all cylinders are operated during engine acceleration; however, only six cylinders are operated during engine cruise operation and only four are operated during extended cruise conditions. In this known arrangement, the cylinders are not completely disabled, but are rather continuously operated by the crankshaft. That is, the pistons are continuously reciprocated within the cylinder, although spark and fuel is not supplied thereto. While the efficiency of such an engine is somewhat increased, the engine still suffers significant mechanical friction and pumping losses.

Obviously, a better solution would be to provide an engine wherein particular cylinders may be engaged and completely disengaged automatically thus reducing friction and pumping losses. In this case, the cylinders could be operated at peak efficiency while providing the wide variations in horsepower required by the vehicle between acceleration and cruise. Obviously, such a system requires a clutch mechanism for engaging and disengaging crankshaft sections so as to effectively disconnect selected cylinders as the engine reaches its cruise state. This process must be reversed as engine load conditions increase.

One very important requirement of such a clutch is that it must engage adjacent crankshaft sections in a single predetermined angular relationship so that the engaged crankshaft sections operate as a single crankshaft. Thus, the required clutch apparatus must include means for assuring that adjacent crankshaft sections are engaged in phase.

SUMMARY OF THE INVENTION

It is an object of the present invention to provide an improved clutch. It is a further object of the present invention to provide an improved synchronizing clutch for use in a split crankshaft engine.

It is a further object of the present invention to provide an improved synchronizing clutch of use in a split crankshaft engine including means for assuring that adjacent crankshaft sections are engaged in phase.

According to a broad aspect of the invention there is provided a synchronizing clutch for use in a split crankshaft engine of the type which includes a main crankshaft section and at least one auxiliary crankshaft section comprising a clutch plate fixedly coupled to the input section, a first engagement plate coupled on the input section, a second engagement plate rotatably coupled on the input section and in frictional engagement with the first engagement plate, a pin plate fixedly coupled to an adjacent end of said at least one auxiliary crankshaft section, a first actuation means coupled to the input section which, when placed in a first condition, disengages the first engagement plate from the second engagement plate and substantially reduces the speed of the second engagement plate, and when placed in a second condition, causes the first engagement plate to engage the second engagement plate causing the second engagement plate to rotate producing a relative angular velocity between the first and second engagement plates, and second actuation means coupled to the pin plate which, when placed in a first condition disengages the pin plate from the first and second engagement plates so as to disengage the main and auxiliary crankshaft sections, when placed in a second condition, causes the pin plate to engage the second engagement plate, and when placed in a third condition, causes the pin plate to engage the first engagement plate to couple, in phase, the main and auxiliary crankshaft sections.

The above and other objects, features and advantages of the present invention would be more clearly understood from the following detailed description taken in conjunction with the accompanying drawings, in which:

BRIEF DESCRIPTION OF THE DRAWINGS

FIGS. 2-6 illustrate in more detail the components of the inventive synchronizing clutch at several stages during the process of engaging both crankshaft sections;

FIGS. 7 and 8 are front and side views of one of the engagement plates utilized in the inventive synchronizing clutch;

FIG. 9 is a front view of a second engagement plate utilized in the inventive synchronizing clutch; and FIG. 10 is a perspective view of a synchronizing clutch manufactured in accordance with the teachings of the present invention.

DESCRIPTION OF THE PREFERRED EMBODIMENT

Figure 1:
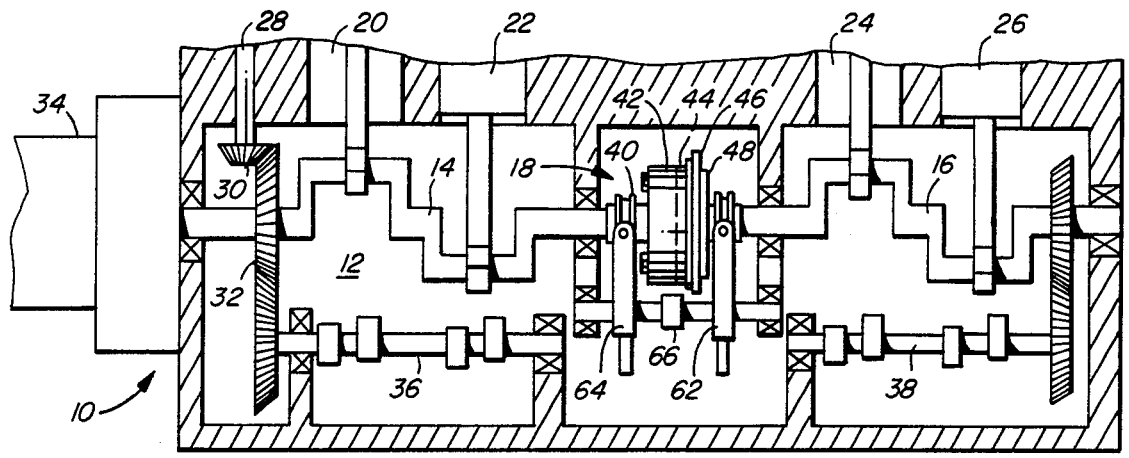
FIG. 1 is a cross-sectional view of an internal combustion engine utilizing a synchronizing clutch in accordance with the present invention for engaging and disengaging two sections of a split crankshaft.

Referring to FIG. 1, there is illustrated a portion of an internal combustion engine 10 of the type which is generally understood by those skilled in the art. Engine 10 includes a split crankshaft 12 including a main section 14 and an auxiliary section 16 which, as will be described hereinbelow, are selectively engaged or disengaged by the inventive synchronizing clutch assembly generally denoted 18. As can be seen, main and auxilary sections 14 and 16 respectively are bearing coupled such as is shown at 15. For explanation purposes, engine 10 is illustrated as having four cylinders including main cylinders 20 and 22 and auxiliary cylinders 24 and 26. It will be obvious, however, to those skilled in the art that the inventive synchronizing clutch 18 may be used in conjunction with engines having any number of cylinders.

A geared shaft 28 couples a distributor (not shown) to split crankshaft 12 by means of meshed gears 30 and 32. The pistons in the main cylinders 20 and 22, as well as those in auxiliary cylinders 24 and 26, are connected by respective rod bearing assemblies to sections 14 and 16 of crankshaft 12. A transmission 34 is illustrated as being coupled to split crankshaft 12 for supplying drive power to the drive shaft of the vehicle. Individual camshaft sections 36 and 38 are geared to crankshaft sections 14 and 16 respectively and drive valves associated with each cylinder as is well understood in the art.

When the engine is operating in its cruise mode, only 20% to 30% of the available horsepower from engine 10 is required to satisfactorily operate the vehicle in which the engine is installed. Thus, during the cruise mode when the engine RPM is substantially constant, only the pistons associated with cylinders 20 and 22 need be operated continuously to provide engine drive. Thus, in this mode of operation, synchronizing clutch 18 causes auxiliary crankshaft section 16 to be disconnected from the main crankshaft section 14. In this manner, movement of the pistons and cylinders 24 and 26 is prevented, fuel consumption is reduced and friction and pumping losses are eliminated. During acceleration, however, clutch 18 causes auxiliary crankshaft section 16 to be coupled to main crankshaft section 14 so as to provide the additional horsepower to accelerate the vehicle.

Referring to FIGS. 1 and 10, the inventive synchronizing clutch assembly comprises an input section or throw-out bearing 40 coupled to a first end of crankshaft section 14, a clutch plate assembly 42 (e.g. a Honda clutch Model CB 750 K3) coupled to input section 40, a drive engagement plate 44, a driven engagement plate 46 and a pin plate 48 which, as is shown, is coupled to an end of crankshaft section 16 via output or throw-out bearing 41. Pin plate 48 is equipped with first and second positioning pins 50 and 52 which are caused to engage and disengage apertures in engagement plates 44 and 46 by means of a handle mechanism 54, a lever assembly 56 which is coupled to handle 54 and to clutch fork 62. Thus, by rotating handle assembly 54, translational movement is imparted to pin plate 48. In a similar manner, input section 40 may be moved by means of a handle assembly 58, lever arm 60 and clutch fork 64 which is coupled to input section 40. In FIG. 1, and throughout the remainder of the drawing, the handle assemblies 54 and 58 and their associated lever arms 56 and 60 respectively are represented graphically as clutch forks 62 and 64 respectively.

Coupled to lever arm 60 is a brake pad 66 by means of shaft 68. When handle assembly 58 is rotated to disengage plate 44 from plate 46, brake shoe 66 is urged against that portion of engagement plate 46 which extends beyond engagement plate 44. This will be described in more detail below. As can be seen, a spring 70 around shaft 68 biases lever arm 60 and must be compressed in order to engage brake pad 66 and engagement plate 46.

Figure 2:
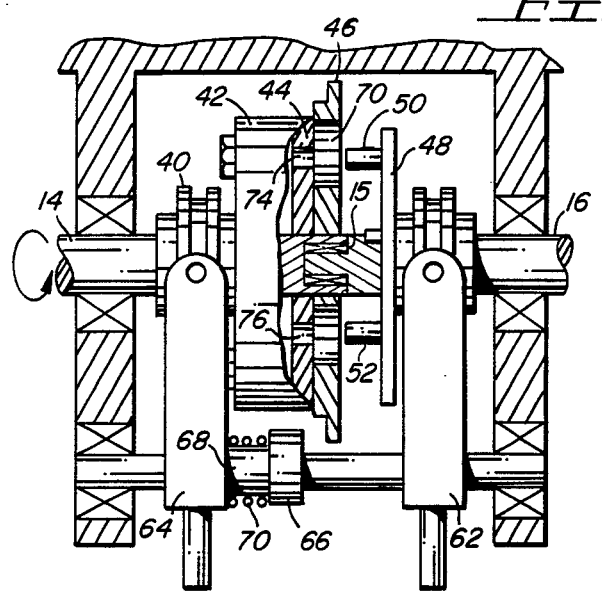

A sequence of steps will now be described in conjunction with FIGS. 2-6 to illustrate how the main and auxiliary crankshaft sections may be coupled together in the correct phase so as to provide the additional power required under high load conditions such as acceleration, First, reffering to FIG. 2, pins 50 and 52 coupled to pin plate 48 are totally extracted from the apertures in engagement plates 44 and 46. Therefore, the secondary or auxiliary crankshaft section 16 is not coupled to primary section 14.

Figure 3:
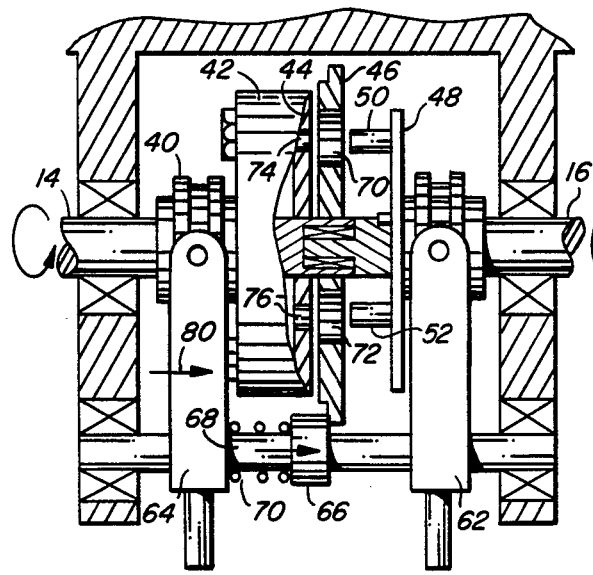

Next, let us assume that clutch fork 64 is activated so as to disengage plate 44 from engagement plate 46 as is shown in FIG. 3. Simultaneously, brake pad 66 engages engagement plate 46 to slow it down.

Figure 4:
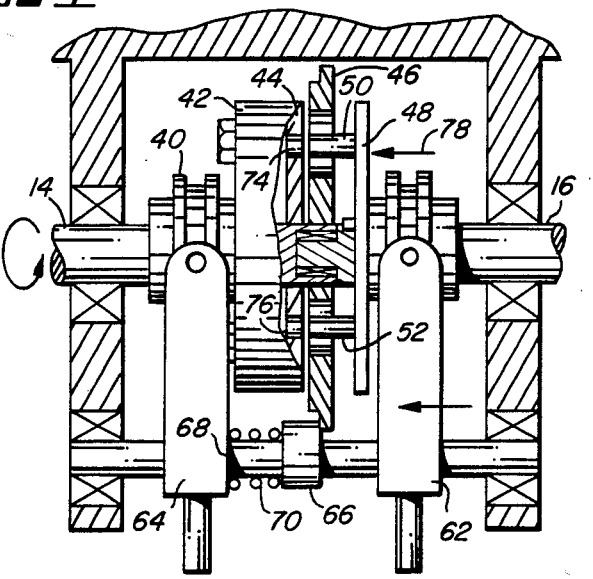

When the velocity of engagement plate 46 has reduced sufficiently, clutch fork 62 may be activated so as to move pin plate 48 in the direction of arrow 78. Clutch fork 62 is activated only to an extent which will cause pins 50 and 52 to enter apertures (slots) 70 in engagement plate 46 when the velocity of plate 46 is sufficiently reduced. This situation is shown in FIG. 4.

As is shown in FIG. 9, engagement plate 46 is provided with quadrature slots 70 for receiving pins 50 and 52.

Figure 5:
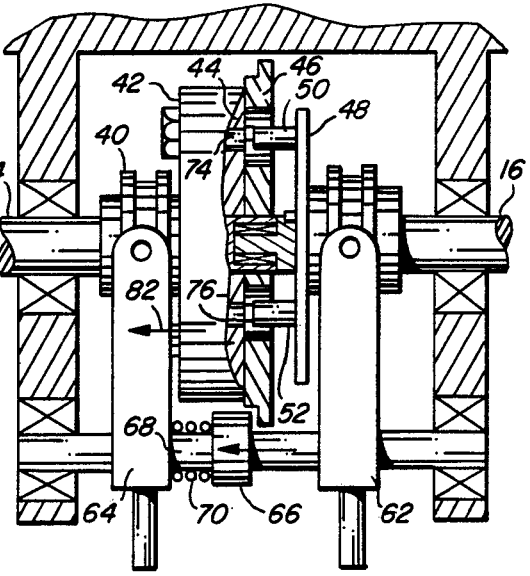

Next, referring to FIG. 5, assembly 64 is released which causes brake pad 66 to move away from plate 46 in the direction of arrow 82, and further causes plate 44 to reengage plate 46. When, the relative velocity of engagement plate 44 and 46 is sufficiently small, pins 50 and 52 will enter apertures 74 and 76 as is shown in FIG. 6 so as to bring crankshaft section 16 in full engagement with crankshaft section 14. In this manner, the engine may operate under heavy load conditions such as acceleration.

Several comments should be made regarding the apertures in the engagement plate. FIGS. 7 and 8 are top and side views of engagement plate 44. To assure that the main and auxiliary crankshaft sections 14 and 16 are coupled in phase, apertures 74 and 76 are spaced at different distances from the center as is shown in FIG. 7. Pins 50 and 52 on pin plate 48 are likewise positioned at different distances from the center. Thus, only pin 50 will engage aperture 74. Pin 52 will never engage aperture 74 since the respective orbits of pin 52 and aperture 74 are different. In contrast, the orbit of pin 52 is the same as that of aperture 76. Therefore, pin 52 will engage aperture 76. In addition, each aperture is provided with a tapered channel 86 which facilitates entry of the pins on pin plate 48 in the apertures.

The above description is given by way of example only, changes of form and details may be made by one skilled in the art without depriving from the scope of the invention. For example, while mechanical means have been shown for enaging and disengaging plate 44 and plate 46 and moving pin plate 48 towards engagement plates 46 and 44, it should be clear that other activation mechanisms may be employed. If manual, such mechanism may be deployed in the cab of the vehicle through hand or foot actuation. Such mechanisms could, for example, be solenoid operated, and the control signals could be mounted on the dash board of a vehicle. Alternatively, the translational movements of clutch plates 44 and 46 and pin plate could be microprocessor controlled.

I claim:

1. In a split crankshaft engine of the type which includes a main crankshaft section and a least one auxiliary crankshaft section, a synchronizing clutch comprising:
   an input section coupled to a first end of said main crankshaft section;
   a clutch plate fixedly coupled to said input section;
   a first engagement plate rotatably coupled on said input section;

a second engagement plate rotatably coupled on said input section and in frictional engagement with said first engagement plate;

a pin plate fixedly coupled to an adjacent end of said at least one auxiliary crankshaft section;

a first actuation means coupled to said input section which, when placed in a first condition, disengages said first engagement plate from said second engagement plate and substantially reduces the speed of said second engagement plate, and when placed in a second condition, causes said first engagement plate to engage said second engagement plate causing said second engagement plate to rotate producing a relative angular velocity between said first and second engagement plates; and second actuation means coupled to said pin plate which, when placed in a first condition disengages said pin plate from said first and second engagement plates so as to disengage said main crankshaft section and said auxiliary crankshaft section, when placed in a second condition, causes said pin plate to engage said second engagement plate, and when placed in a third condition, causes said pin plate to engage said first engagement plate to couple, in phase, said main and auxiliary crankshaft sections.

2. A synchronizing clutch according to claim 1 wherein said pin plate engages said second engagement plate when the speed of said second engagement plate is substantially reduced by said first actuation means and said second actuation means is in said second condition and further engages said first engagement plate when said first actuation means is placed in said second condition causing said first engagement plate to rotate with respect to said engagement plate.

3. A synchronizing clutch according to claim 2 wherein said first actuation means includes a brake which engages said second engagement plate to reduce its speed when said first actuation means is placed in said first condition.

4. A synchronizing clutch according to claim 3 wherein said first and second actuation means are manually operated.

5. A synchronizing clutch according to claim 3 wherein the diameter of said second engagement plate is greater than that of said first engagement plate resulting in a portion of said second engagement plate extending beyond said first engagement plate and wherein said brake engages that portion of said second engagement plate which extends beyond said first engagement plate.

6. A synchronizing clutch according to claim 3 wherein said pin plate is equipped with first and second pins extending toward said second engagement plate.

7. A synchronizing clutch according to claim 6 wherein said first and second pins have different orbits about the center of rotation of said pin plate.

8. A synchronizing clutch according to claim 7 wherein each of said first and second engagement plates is equipped with first and second apertures for receiving said first and second pins.

9. A synchronizing clutch according to claim 8 wherein said first aperture in said first engagement plate resides in the same orbit as said first pin and wherein said second aperture in said first engagement plates resides in the same orbit as in said second pin.

10. A synchronizing clutch according to claim 9 wherein each of said first and second apertures in said first engagement plate is equipped with a tapered channel to facilitate entry by said first and second pins.

11. A synchronizing clutch according to claim 10 wherein said second engagement plate contains four quadrature slots for receiving said first and second pins.

* * * * *